Figure 1:
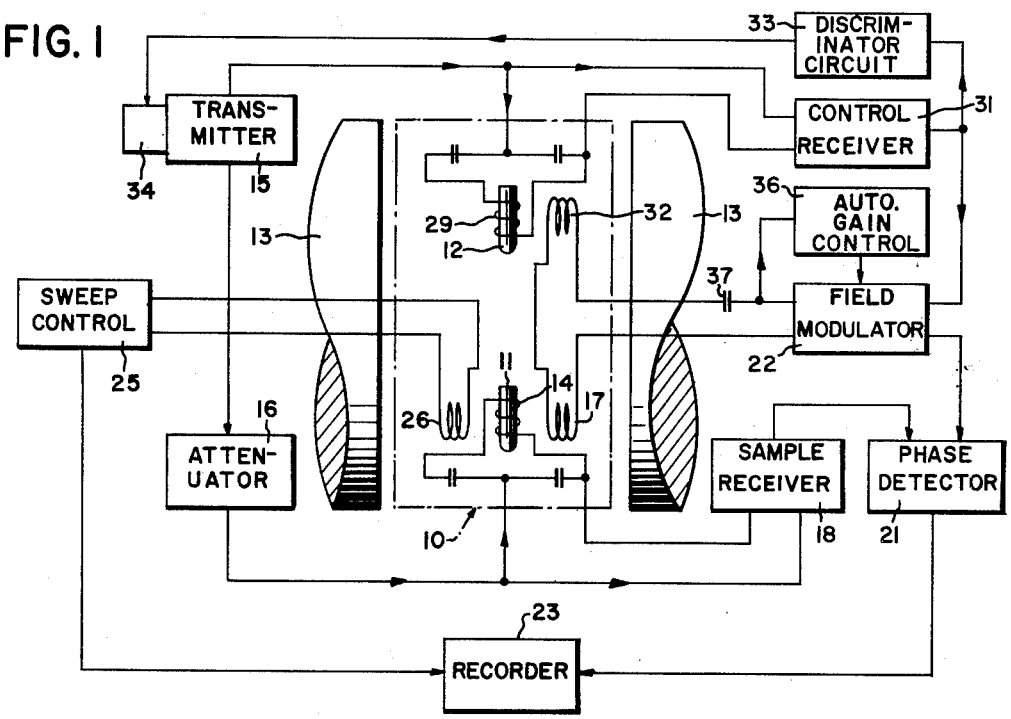

March 31, 1964     D. E. GIELOW ETAL     3,127,556

GYROMAGNETIC RESONANCE APPARATUS

Filed Aug. 14, 1961

INVENTORS
DAVID E. GIELOW
DAVID L. WRIGHT
BY
ATTORNEY

United States Patent Office 3,127,556
Patented Mar. 31, 1964

3,127,556
GYROMAGNETIC RESONANCE APPARATUS
David E. Gielow, Mountain View, and David L. Wright, Palo Alto, Calif., assignors to Varian Associates, Palo Alto, Calif., a corporation of California
Filed Aug. 14, 1961, Ser. No. 131,414
10 Claims. (Cl. 324—.5)

This invention relates in general to gyromagnetic resonance apparatus, and more particularly to the production of a constant modulation index in a gyromagnetic apparatus utilizing side band resonance.

In U.S. patent application No. 71,184, now abandoned, and wherein the inventors are Weston A. Anderson, Forest A. Nelson and David L. Wright and the application is assigned to the same assignee as this application, a gyromagnetic resonance apparatus which utilizes the sideband resonance technique is described and taught. In general the sideband resonance technique employs a scheme whereby a gyromagnetic substance is polarized by a unidirectional magnetic field of intensity $H_0$, a radio-frequency ($\omega_{rf}$) magnetic field is applied to the substance at right angles to the polarizing field, and then the ratio $$\frac{\omega_0}{H_0}$$

which is the Larmor constant is modulated at a frequency ($\omega_m$) which is lower than the radio frequency so that sideband radio-frequency resonance signals ($\omega_0 \pm n\omega_m$) are produced. The modulated frequency is demodulated and one of the $n\omega_m$ components is detected, for example, to provide a nuclear magnetic resonance spectrum of the polarized substance.

Usually the polarizing magnetic field $H_0$ rather than the radio-frequency is modulated since the polarizing magnetic field can be readily modulated by placing a magnetic coil within and aligned with the polarizing magnetic field and then applying an alternating current to the coil. The precession frequency ($\omega_A$) of the magnetic moment of the substance is dependent on the strength of polarizing magnetic field ($H_0$) and the magnetic field amplitude ($H_m$) at which the polarizing magnetic field is modulated, since $$\omega_A = \gamma H_0 + \gamma H_m \cos(\omega_m t)$$

where $\omega_A$ is the resonance frequency of the substance, $\omega_m$ is the modulation frequency, and $\gamma$ is the Larmor contant.

Since $\gamma H_0$ is equal to $\omega_0$ and $\gamma H_m$ is a change in frequency $\Delta \omega$, the precession frequency of the sample is then equal to:

$$\omega_A = \omega_0 + \Delta \omega \cos \omega_m t$$

Since the sideband gyromagnetic apparatus responds to the instantaneous voltage ($V_s$) of this wave, the instantaneous voltage is written as follows (neglecting higher order sideband terms and for small modulation indexes)

$$V_s = A \cos \omega_0 t + \frac{A \Delta \omega}{2\omega_m} \sin(\omega_0 t + \omega_m t) + \frac{A \Delta \omega}{2\omega_m} \sin(\omega_0 t - \omega_m t)$$

where A is a constant and is dependent on the number of nuclei coupled to the coil in a given system. The first expression on the right hand side of the equation represents the instantaneous voltage of the $\omega_0$ signal, the second expression represents the instantaneous voltage of the upper sideband, and the third expression is the instantaneous voltage of the lower sideband. The expression $$\frac{\Delta \omega}{\omega_m}$$

is defined as the modulation index and therefore the voltage ($V_s$) of either sideband is dependent on the index.

An accurate quantitative gyromagnetic apparatus requires the voltage $V_s$ to be only dependent on A, and the modulation index $$\left(\frac{\Delta \omega}{\omega_m}\right)$$

is required to remain substantially constant. When the apparatus automatically adjusts $\omega_m = \omega_{rf} \pm \omega_0$ to maintain resonance while $\omega_0$ and $\omega_{rf}$ may vary, large shifts in $\omega_m$ may occur since it is the difference between two large numbers. Shifts in $\omega_m$ must be compensated by corresponding shifts in $\Delta \omega$. Since $\Delta \omega$ varies directly with $H_m$, and $H_m$ varies directly with the current in the modulation magnetic coil, this requires that the modulation coil current vary directly as the frequency $\omega_m$; however, the impedance of the coil is inductive which makes the current vary inversely with $\omega_m$.

An object of this invention is to provide an improved circuit incorporating an alternating current generator and field modulation coil in a gyromagnetic apparatus for producing a constant modulation index.

A feature of this invention is a reactive impedance means in combination with a magnetic coil, said means counteracting the increasing impedance in the coil as the frequency increases in order to maintain a constant modulation index while using a common constant voltage generator.

Another feature of this invention is a means in combination with a generator circuit and magnetic coil wherein the potential supplied by the circuit varies directly with frequency such that the voltage increases as the frequency increases and decreases as the frequency decreases to maintain a constant modulation index.

Another feature of this invention is a means in combination with a generator and magnetic coil wherein the current in the coil varies directly with frequency such that the current increases as the frequency increases and decreases as the frequency decreases.

Another feature of this invention is a capacitor in series with a generator circuit and a magnetic coil.

Figure 2:
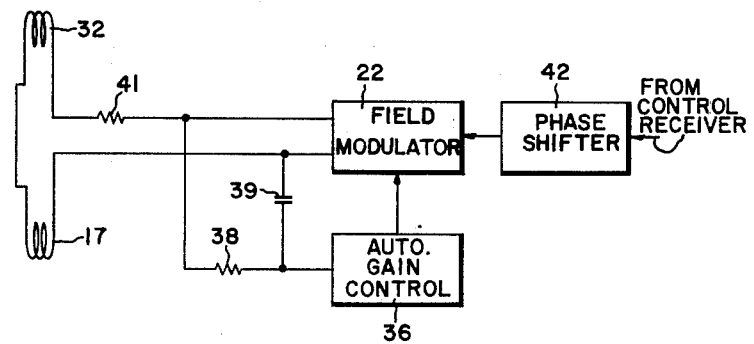

These and other features and advantages of the present invention will be more apparent after a perusal of the following specification taken in connection with the accompanying drawings wherein, FIG. 1 is a schematic and block diagram of a typical sideband, gyromagnetic resonance spectroscopy system including one embodiment of a circuit for maintaining a constant modulation index, and FIG. 2 is a block diagram of a circuit employing another embodiment of a circuit for maintaining a constant modulation index.

Referring to FIG. 1 there is shown in block diagram form a single coil, two-sample, sideband, gyromagnetic resonance spectroscopy system embodying novel means for maintaining a constant modulation index. Although an apparatus having both, a sideband oscillator control sample and a test sample, is shown, the invention is also useful in an apparatus employing only the test sample or the sideband oscillator. Within a probe 10, a chemical sample 11 to be analyzed by means of gyromagnetic resonance, for example, resonance of the nuclear magnetic moments of the sample, and a control sample of substance 12 utilized in the sideband resonance oscillator are placed within the strong unidirectional polarizing magnetic field $H_0$ formed between the gap of a permanent magnet or electromagnet represented by magnetic pole pieces 13. An R.F. coil 14 is located in close coupling relationship to the sample 11 with its axis substantially perpendicular to the unidirectional magnetic field $H_0$. A radio frequency transmitter 15, such as a crystal controlled oscillator, is coupled to the coil 14 (through an attenuator circuit 16, if desired) and supplies a radio frequency driving magnetic field $H_1$ to the sample 11 at an angular frequency $\omega_0$ to produce the desired nuclear magnetic resonance in the sample 11 in a manner well known in the art, sideband resonance being produced in a manner described below. At or near resonance of the nuclear magnetic moments in the sample 11, the coil 14 has induced therein a signal due to the resonance condition of the nuclei at the frequency $\omega_A$.

The unidirectional magnetic field $H_0$ is modulated by an audio or low frequency magnetic field $H_m$ from the audio or low frequency modulation coil 17 coupled to the nuclear side band oscillator channel (to be subsequently described) at an audio or low frequency $\omega_m$, the amplitude of the unidirectional magnetic field $H_0$ thus being modulated at the audio frequency rate to give an instantaneous total field $H_A = H_0 + H_m \cos(\omega_m t + \phi)$, where $t$ is time.

The effects of magnetic field modulation are explained in the above mentioned application. Therefore, the total signal in the R.F. coil transmitted to the sample receiver circuit 18 includes a leakage signal at the transmitter frequency $\omega_{rf}$ which is mixed with a nuclear resonance signal from the nuclear magnetic moments with a frequency component $\omega_0$ as well as components at all frequencies which differ from $\omega_0$ by an amount $\omega_m$, $2\omega_m$, $3\omega_m$ . . . These R.F. signals are received by the circuit 18 which amplifies the signals and then demodulates them to produce an output signal at the low or audio frequency $\omega_m$.

This $\omega_m$ output is fed to an audio mixer or phase detector circuit 21 which obtains its reference frequency $\omega_m$ directly from the sideband oscillator channel. The output of this mixer 21 contains a direct current signal which is suitable for observation on an oscilloscope or for recording on a graphic recorder 23 or the like. The unidirectional magnetic field $H_0$ may be slowly swept through resonance as in a manner utilized in previous gyromagnetic resonance spectrometers, for example, by a saw-tooth sweep generator 25 and a sweep coil 26, the output of the sweep generator 25 also being utilized to synchronize the recorder 23 when necessary. When it is desired to regulate the polarizing field strength at one sample relative to the field strength at the other sample, a small bias field may be supplied, for example, by supplying an adjustable D.C. current through the sweep coil 26 from a control circuit in the power supply.

The sideband oscillator utilized to provide the audio or low frequency modulating signal to the substance 11 comprises the transmitter 15 coupled (which may contain an attenuator circuit if desired) to a radio frequency coil 29 surrounding the substance 12 to produce a driving radio frequency field $H_1$ at an angular frequency $\omega_{rf}$ at the substance. The coil 29 is coupled to a control receiver circuit 31 that forms the nuclear sideband oscillator channel in conjunction with the field modulator circuit 22 and the coils 17 and 32 which modulate the magnetic field at both samples. The control receiver circuit 31 like the sample receiver circuit 18, amplifies the signals from the substance 12 and then demodulates the signal to produce an output signal at the audio frequency $\omega_m$, which is in turn amplified in the field modulator circuit 22 and supplied to the modulation coils 17 and 32. This sideband oscillator is a self-excited oscillator in which the frequency of the audio or low frequency feedback signal varies with and is determined by the strength of the unidirectional magnetic field $H_0$ in accordance with the general relationship $\omega_m = \gamma H_0 - \omega_{rf}$ where $\omega_{rf}$ is the actual frequency of the transmitter 15.

This spectrometer also incorporates control for transmitter 15 in that the audio frequency signal output from circuit 31 is transmitted to an audio discriminator circuit 33 as well as to the field modulator circuit 22. The audio discriminator 33 produces a D.C. output signal having an amplitude proportional to the variation in the frequency $\omega_m$ from a normal value. This variable amplitude D.C. signal is utilized to operate a control circuit such as a variable reactor 34 in the transmitter 15 to vary the frequency $\omega_{rf}$ thereof in a manner to compensate for drifts in the field $H_0$.

Since the audio frequency $\omega_m$ varies due to circuit frequency instability and also in accordance with the polarizing unidirectional magnetic field $H_0$, $\Delta\omega$ must vary accordingly so that the modulation index $(\Delta\omega/\omega_m)$ remains contant. $\Delta\omega$ is dependent on the amplitude of the modulating magnetic field $(H_m)$ and it in turn is dependent on the current flowing in coils 17 and 32. Normally the current in coils 17 and 32 drops off as the frequency increases (even though the voltage output of the field modulator 22 is maintained at a constant value by a common automatic gain control circuit 36) since the impedance of the coils, being mainly inductive, increases with frequency.

In the embodiment of the invention as shown in FIG. 1 an impedance means comprising a capacitor 37 is installed in series between the field modulator 22 and the coils 17 and 32. The impedance of capacitor is much larger than the total inductive impedance of the coils 17 and 32 so that the impedance in the circuit is primarily capacitive. Therefore the impedance of the circuit decreases as the frequency increases. This embodiment being a capacitive impedance introduces a 90° phase shift in the modulating signal to the coils 17 and 32 which is needed in the arrangement shown to maintain the proper phase condition for self-sustained oscillation in the loop containing the control sample 12. Since the impedance of the circuit changes inversely with frequency and since the automatic gain control maintains the voltage across the field modulator constant, the current increases in the coils 17 and 32. Therefore $H_m$ and $\Delta\omega$ correspondingly increase as the frequency increases or correspondingly decrease as the frequency decreases.

Referring to FIG. 2 another embodiment of the reactance impedance means is shown (like numbered elements represent the same elements as FIG. 1). The means comprises a low pass filter made, for example, with a resistor 38 and a capacitor 39 series connected across the field modulator 22 output. A resistor 41 is connected in series with the modulating coils 17 and 32; the resistor 41 is the main impedance in its series circuit. In this particular example the automatic gain control circuit 36 is connected to the junction of the capacitor 39 and the resistor 38. The resistor 38 and capacitor 39 form a simple low pass filter wherein the attenuation increases with frequency. The modulation index is constant since the automatic gain control 36 maintains a constant voltage across the capacitor 39. Since the voltage drop across the resistor 38 increases with frequency in order to maintain a constant voltage across the capacitor, the voltage across the field modulator must also increase with frequency. The resistor 41 in series with coils 17 and 32 being the main impedance in the series circuit thereby makes the series circuit primarily resistance, so that the current therein increases with voltage and frequency. If the resistance of the coils 17 and 32 are greater than their inductive reactance, or if the voltage of the field modulator is increased at a faster rate than the frequency increase so that the inductive impedance of the coils does not increase as rapidly as the voltage, resistor 41 would not be required.

This embodiment does not produce a phase shift in the modulation signal as does the embodiment of FIG. 1. Therefore, if the embodiment of FIG. 2 is to be incorporated in the apparatus of FIG. 1, a 90° phase shift circuit 42 must be incorporated in the field modulator or in the receiver demodulation.

In an exemplary embodiment of a gyromagnetic apparatus in accordance with the present invention, the magnetic field $H_0$ was about 14,000 gauss, and the radio frequency and the precession frequency were about 60 megacycles.

The audio frequency $\omega_m$ could vary between 4800–5200 cycles per second to allow for shifts in the transmitter frequency and shifts in the magnetic field $H_o$, yet the signal resolution of the apparatus remained high, in the region of 1 part in $10^8$, and the signal amplitude was stable within less than 1%.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyromagnetic resonance apparatus, the combination comprising a transmitter means for supplying a radio frequency driving magnetic field to at least one gyromagnetic sample, first means for forming a polarizing magnetic field for the sample, second means for periodically modulating one of the magnetic fields, the frequency of said modulation being subject to variations, and third means coupled to said second means and responsive to said modulation frequency variations for regulating the amplitude of said modulation in variable accordance with said modulation frequency to thereby maintain a constant modulation index.

2. In a gyromagnetic resonance apparatus, the combination comprising a transmitter means for supplying a radio frequency driving magnetic field to at least one gyromagnetic sample, first means for forming a polarizing magnetic field for the sample, second means for periodically modulating the polarizing magnetic field, the frequency of said modulation being subject to variations and third means coupled to said second means and responsive to said modulation frequency variations for regulating the amplitude of said modulation in variable accordance with said modulation frequency to thereby maintain a constant modulation index.

3. The combination of claim 2 wherein said second means comprises a magnetic coil aligned within the polarizing magnetic field, and including an alternating current power supply for said coil, said third means comprising a reactive impedance means coupled to said alternating current power supply for regulating the amplitude of alternating current in said coil in direct relation to the freqeuncy of said power supply.

4. The combination of claim 3 wherein said impedance means comprises a capacitor coupled in series with said power supply and said magnetic coil.

5. The combination of claim 4 wherein the impedance of said capacitor is the main impedance in the series circuit.

6. In a gyromagnetic resonance apparatus, the combination comprising a transmitter means for supplying a radio frequency driving magnetic field to at least one gyromagnetic sample, first means for forming a polarizing magnetic field for the sample, a magnetic coil aligned within the polarizing magnetic field, an alternating current power supply for supplying alternating current to said coil, and means coupled to said power supply for regulating the current in said coil in direct relation to the frequency of the alternating current, said means comprising a low pass filter attenuation circuit coupled to the output of said power supply, said circuit attenuating inversely with frequency, and means for maintaining the output of said attenuation circuit constant so that the variation of the output of said power supply with frequency is inverse to the variation of the attenuation of said attenuation circuit with frequency.

7. In the combination of claim 6 wherein the low pass filter attenuation means comprises a first resistor and a capacitor in series connected across said power supply, and including an automatic gain control circuit deriving a voltage signal from the junction of said resistor and capacitor to regulate the gain in said power supply for regulating the output voltage of the power supply in relation to the frequency of the power supply.

8. The combination of claim 7 wherein a second resistor is series connected between said coil and said power supply and parallel connected to the first resistor and capacitor, the second resistor being the main impedance in the series circuit comprising said second resistor and said coil.

9. In a gyromagnetic resonance spectrometer, the combination comprising: means for forming a polarizing unidirectional magnetic field; means for disposing a test sample and a control sample in said polarizing field; means for supplying a radio frequency driving magnetic field to said samples; means for periodically modulating one of said magnetic fields at a low frequency for enabling sideband gyromagnetic resonance to be established in said samples; means responsive to the resonance of said control sample for stabilizing said resonance in said polarizing magnetic field by controlling the frequency of said magnetic field modulation; and means responsive to variations in modulation frequency resulting from said stabilization for varying the amplitude of said modulation in direct relation to said modulation frequency to thereby maintain a constant index of modulation.

10. The combination of claim 9 wherein said stabilization means includes means for detecting a modulation frequency component in the sideband resonance signal of said control sample, said signal component being used to provide said periodic modulation of the magnetic field and thereby maintain self-sustained oscillation of said signal component at a modulation frequency establishing the sideband resonance of said control sample.

References Cited in the file of this patent

UNITED STATES PATENTS

| | | |
|---|---|---|
| 2,589,494 | Hershberger | Mar. 8, 1952 |
| 3,045,175 | Rollwitz | July 17, 1962 |

OTHER REFERENCES

Smaller: Physical Review, vol. 83, No. 4, Aug. 15, 1951, pp. 812 to 820 incl.

Schneider: Physical Society of London Proceedings, vol. 61, No. 348, Dec. 1, 1948, pp. 569 to 571 incl.

Wegmann et al.: Archives Des Sciences vol. 11 (7th Colloque Ampere, special), pp. 198 to 202 incl.

UNITED STATES PATENT OFFICE
CERTIFICATE OF CORRECTION

Patent No. 3,127,556                            March 31, 1964

David E. Gielow et al.

It is hereby certified that error appears in the above numbered patent requiring correction and that the said Letters Patent should read as corrected below.

Column 1, line 13, after "now abandoned" insert -- in favor of continuation-in-part, Serial No. 174,950 --.

Signed and sealed this 10th day of November 1964.

(SEAL)
Attest:

ERNEST W. SWIDER                               EDWARD J. BRENNER
Attesting Officer                                    Commissioner of Patents